(12) United States Patent
El Waffaoui

(10) Patent No.: US 7,944,279 B1
(45) Date of Patent: May 17, 2011

(54) CHARGE PUMP STAGE OF RADIO-FREQUENCY IDENTIFICATION TRANSPONDER

(75) Inventor: Rachid El Waffaoui, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 12/650,698

(22) Filed: Dec. 31, 2009

(51) Int. Cl.
*G05F 1/10* (2006.01)
(52) U.S. Cl. ............ 327/536; 340/572.1; 455/41.1
(58) Field of Classification Search .......... 327/536; 363/59–60
See application file for complete search history.

(56) References Cited

U.S. PATENT DOCUMENTS

| | | | |
|---|---|---|---|
| 6,549,064 B2 * | 4/2003 | Bandy et al. | 327/536 |
| 7,157,961 B2 * | 1/2007 | Winton | 327/536 |
| 7,167,090 B1 * | 1/2007 | Mandal et al. | 340/538.14 |
| 7,405,612 B2 * | 7/2008 | Minami et al. | 327/536 |
| 7,561,866 B2 * | 7/2009 | Oliver et al. | 455/343.3 |
| 7,595,732 B2 * | 9/2009 | Shameli et al. | 340/572.5 |
| 7,598,843 B2 * | 10/2009 | Pardoen | 340/10.1 |
| 7,768,406 B1 * | 8/2010 | Peach et al. | 340/572.7 |
| 2006/0094425 A1 * | 5/2006 | Mickle et al. | 455/434 |
| 2008/0212346 A1 * | 9/2008 | Rizzo et al. | 363/60 |
| 2009/0219079 A1 * | 9/2009 | Bergler et al. | 327/536 |
| 2009/0251291 A1 * | 10/2009 | Borcherding | 340/10.1 |
| 2009/0286476 A1 * | 11/2009 | Toncich et al. | 455/41.1 |

FOREIGN PATENT DOCUMENTS

WO   WO 2007/026289 A1   3/2007

* cited by examiner

*Primary Examiner* — Thomas J Hiltunen

(57) ABSTRACT

A charge pump stage of an RFID transponder includes an RF node, a capacitor bank, a plurality of current-biased rectifier stages, a DC bus, a programmable current source and a control circuit. The RF node provides an RF signal. The capacitor bank has a selectable capacitance and is electrically coupled to the RF node. The plurality of current-biased rectifier stages receives the RF signal from the RF node. The plurality of current-biased rectifier stages provides a DC output. The DC bus receives the DC output from the plurality of rectifier stages and provides a supply voltage. The programmable current source provides a plurality of current bias signals for each of the plurality of current-biased rectifier stages. The control circuit is in electrical communication with the capacitor bank and the programmable current source. The control circuit selects the selectable capacitance of the capacitor bank and programs the current source.

21 Claims, 9 Drawing Sheets

Output Voltage of Previous Stage

Reference current used to tune the conduction angle of the rectifier(s)

Parallel real part of the charge pump input impedance

Parallel imaginary part of the charge pump input impedance

CHARGE PUMP STAGE OF RADIO-FREQUENCY IDENTIFICATION TRANSPONDER

BACKGROUND

1. Relevant Field

The present disclosure relates to radio-frequency identification. More particularly, the present disclosure relates to a charge pump stage of a radio-frequency identification transponder.

2. Description of Related Art

Radio Frequency Identification (RFID) systems are widely used for identifying and tracking items, inventory control, supply chain management, anti-theft of merchandise in stores, and other applications. A typical RFID system consists of a plurality of transponders (hereinafter referred to as "RFID tags" or simply as "tags") and one or more transceivers (hereinafter referred to as "RFID readers" or simply as "readers"). A reader interrogates one or more of the tags over a wireless forward link such as an UHF signal. The tags respond to the reader's interrogations by transmitting tag information back to the reader over a wireless return link.

A tag is usually embodied as a semiconductor microchip having a memory for storing the tag's ID number and, in some applications, information concerning the item to which the tag is associated. Further, tags are either "passive" or "active", depending on how they are powered. An active tag contains its own on-board power source, i.e. a battery, which the tag uses to process received signals and to transmit tag information back to a reader. A passive tag does not have its own on-board power source. Rather, it derives the power it needs by extracting energy from the RF carrier signals broadcasted by the reader. The passive tag transmits information to the reader using a process known as load modulation for inductive systems or backscattering for wave propagation systems. A battery assisted tag contains its own on-board power source, i.e. a battery, like an active tag, which the tag uses to process received signals and to power the digital circuit and the memory. However, the battery assisted tag transmits information back to the reader using the same principles as passive tags such as by modulating a backscattered signal. Passive tags have, in many applications, become more popular than active tags, since they are less expensive to manufacture, to maintain, and to operate.

Because passive tags do not have their own power sources, power must be derived from the RF interrogating signal. Typically, an RFID tag includes a loop antenna tuned to receive the RF interrogating signal. The loop antenna is electrically connected to a charge pump of the RFID tag. The RF interrogating signal induces an AC signal within the loop antenna that is provided to the charge pump. The charge pump rectifies and amplifies the voltage of the AC signal to charge a storage capacitor and/or to power digital circuitry. The storage capacitor also provides energy to modulate the RF interrogation signal.

The RFID reader typically generates an RF interrogation signal that is a continuous RF carrier sine wave. A shunting transistor across the loop antenna can be employed to modulate the amplitude of the RF interrogation signal. This modulation of the RF interrogation signal occurs because the absorption of the RF interrogation signal by the loop antenna varies as the shunting transistor is switched on and off. The RFID reader can sense this modulation. In other words, the RFID reader demodulates the modulated backscattered signal to receive the information from the RFID tag.

SUMMARY

In one embodiment of the present disclosure, a charge pump stage of an RFID transponder includes an RF node, a capacitor bank, a plurality of current-biased rectifier stages, a DC bus, a programmable current source and a control circuit. The capacitor bank, the plurality of current-biased rectifier stages, the DC bus, the programmable current source and the control circuit may be integrated on a semiconductor substrate.

The RF node provides an RF signal. The capacitor bank has a selectable capacitance and is electrically coupled to the RF node. The capacitor bank may include one or more switchable binary weighted fringe capacitors. The plurality of current-biased rectifier stages receives the RF signal from the RF node. The plurality of current-biased rectifier stages may include one or more diodes (e.g., two) such that each diode includes an nMOS rectifier and a pMOS rectifier. The plurality of current-biased rectifier stages provides a DC output. The DC bus receives the DC output from the plurality of rectifier stages and provides a supply voltage. The programmable current source provides a plurality of current bias signals for each of the plurality of current-biased rectifier stages. The control circuit is in electrical communication with the capacitor bank and the programmable current source. The control circuit selects the selectable capacitance of the capacitor bank and programs the current source. Each of the plurality of current bias signals may be individually programmed by the control circuit.

In another embodiment of the present disclosure, each of the current-biased rectifier stages includes a prior stage node, a following stage node and a rectifier circuit. The rectifier circuit is electrically coupled to the RF node to rectify the RF signal therefrom. The rectifier receives a first voltage from the prior stage node and boosts the first voltage using the rectified RF signal to a second voltage. The rectifier provides the second voltage to the following stage node. The rectifier stages may be arranged in a cascading configuration. The first stage may be coupled to ground and the final stage may provide the DC output to power the tag circuitry and/or supply the DC bus with a DC output power. Additionally, each rectifier stage may provide the DC bus with an intermediate voltage. The intermediate voltage may be supplied to various digital logic circuitry, RFID circuitry, and/or may be used by the DC bus to provide a sufficient digital logic supply voltage.

In another embodiment of the present disclosure, the control circuit includes a capacitor bank register, one or more current bias registers and a test pad. The capacitor bank register is adapted such that the control circuit selects the selectable capacitance of the capacitor bank in accordance with the capacitor bank register. The one or more current bias registers are each adapted to control one or more current bias signals. The current bias signal or signals current biases one or more of the rectifier stages. Additionally or alternatively, each rectifier stage may receive one or more current signals, e.g., two current sources may tune the conduction angle of a diode of a rectifier stage. The test pad is operatively coupled to the capacitor bank register and the one or more current bias registers. The test pad receives digital data for programming the capacitor bank register and one or more of the current bias registers. For example, the capacitor bank register and the current bias registers may be EEPROM based, and are flash programmable.

In yet another embodiment of the present disclosure, the programmable current includes a binary weighted resistive network. The binary weighted resistive network receives a binary signal from the control circuit thereby programming the programmable current source. The binary weighted resistive network provides one or more current bias signals corresponding to the binary signal from the control circuit.

In yet another embodiment of the present disclosure, the control circuit adjusts or tunes the charge pump stage. The control circuit can tune the Q-factor of the current-biased rectifier stages by varying the plurality of current bias signals provided thereto. The control circuit may individually tune the Q-factor of each of the current-biased rectifier stages. Additionally or alternatively, the control circuit is configured to tune an aggregate Q-factor of the capacitor bank and the plurality of current-biased rectifier stages. The control circuit may tune the aggregate Q-factor by selecting the selectable capacitance of the capacitor bank and individually varying each of the current bias signals provided by the programmable current source to the plurality of current-biased rectifier stages. The control circuit may individually vary the conduction angle of one or more diodes of each of the plurality of current-biased rectifier stages to tune them or to tune the charge pump stage.

The capacitor bank and the plurality of rectifiers have an impedance including a real part and an imaginary part. The control circuit can select the capacitance of the capacitor bank to substantially control the imaginary part of the impedance and program the current source to substantially control the real part of the impedance; therefore, the control circuit can separately and/or independently control the real and imaginary parts of the impedance. The control circuit can match the impedance of the charge stage pump and/or other parts of the RFID transponder to a complex conjugate of an antenna coupled to the RF node.

BRIEF DESCRIPTION OF THE DRAWINGS

These and other advantages will become more apparent from the following detailed description of the various embodiments of the present disclosure with reference to the drawings wherein.

DETAILED DESCRIPTION

Particular embodiments of the present disclosure are described herein below with reference to the accompanying drawings. In the following description, well-known functions or constructions are not described in detail to avoid obscuring the present disclosure with unnecessary detail.

Figure 1:
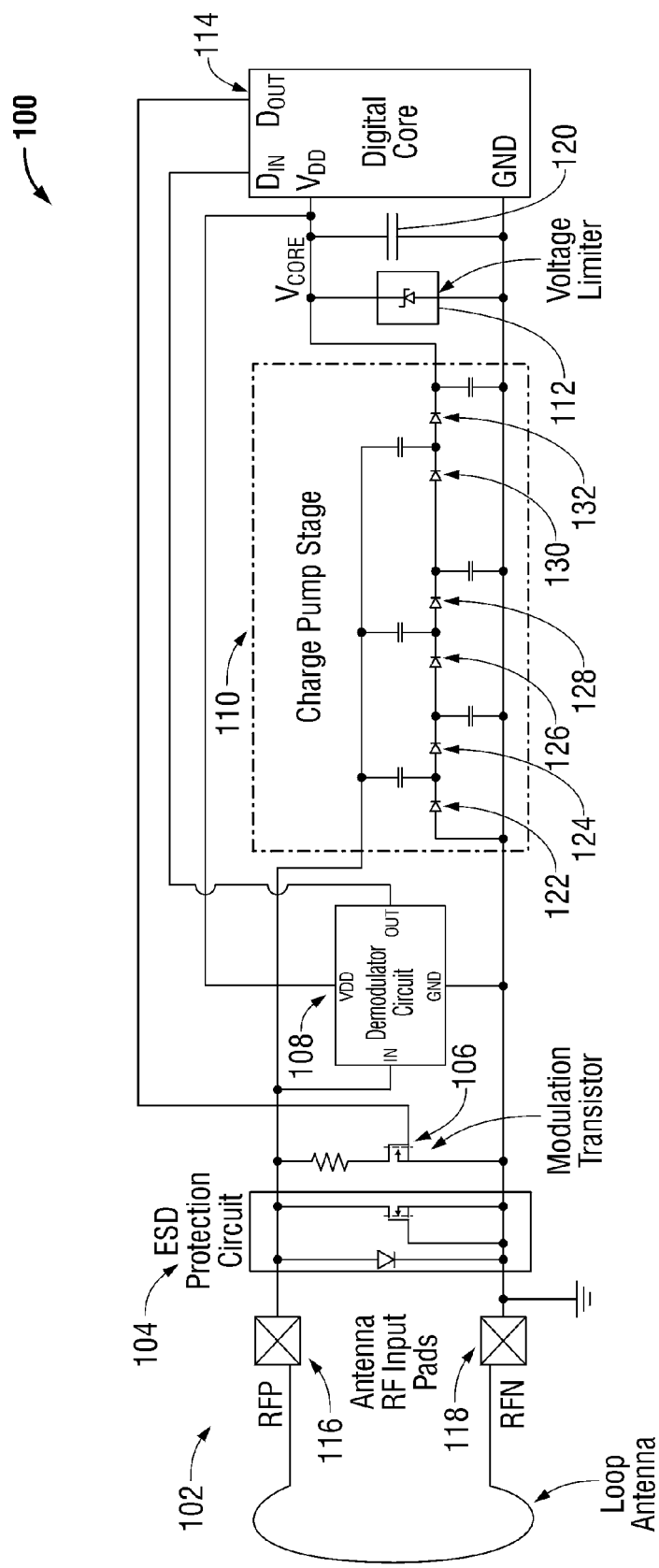
FIG. 1 shows a schematic diagram of an RFID tag in accordance with the present disclosure.

Referring to the drawings, FIG. 1 shows a schematic diagram of an RFID tag 100 in accordance with the present disclosure. The RFID tag 100 includes a loop antenna 102, an electrostatic discharge protection circuit 104, a modulation transistor 106, a demodulator circuit 108, a charge pump stage 110, a voltage limiter 112, and a digital core 114.

The loop antenna 102 receives an RF interrogation signal that induces an RF signal therewithin. The loop antenna 102 is coupled to the circuit RFID tag 100 through the nodes 116 and 118. The induced RF signal (e.g., Radio-Frequency range AC current) is in electrical communication through the electrostatic discharge protection circuit 104 to the charge pump stage 110. The electrostatic discharge protection circuit 104 prevents voltage spikes from damaging the RFID tag 100. When a threshold voltage level develops across the nodes 116 and 118, the electrostatic discharge protection circuit 104 temporarily grounds the connection therebetween preventing undesired voltages from developing within the circuitry of the RFID tag 100.

The RF signal is coupled to the charge pump stage 110, which rectifies the oscillating voltage and charges the capacitor 120. The stored energy of the charge pump stage 110 and the capacitor 120 is used to power the digital core 114. The stored energy is usable by the digital core 114 and the demodulator circuit 108. The digital core 114 additionally powers the modulation transistor 106. The voltage limiter 112 protects the digital core 114 from overvoltages.

The demodulator 108 demodulates digital information from the RF interrogation signal and communicates the digital information to the digital core 114. The digital core 114 analyzes the digital information to formulate a response. The digital core 114 turns on and off the modulation transistor 106 to vary the RF interrogation signal. This variation in the interrogation signal is detectable by an RFID reader (not shown) to receive the information from the digital core 114.

In addition to the charge pump stage 110, the electrostatic protection circuit 104, the modulation transistor 106, the demodulation circuit 108 and physical wires interconnecting the parts, all contribute to the input impedance of the RFID tag 100.

One performance characteristic of the RFID tag 100, and RFID tags in general, is read range. The read range is the maximum distance at which an RFID reader can detect the backscattered RF interrogation signal from the RFID tag. Because the RFID reader's sensitivity is typically high in comparison with the RFID tag, the read range is usually defined by the RFID tag response threshold. The read range is also sensitive to the RFID tag's orientation, the material(s) of the RFID tag, the substrate material of the RFID tag and the propagation environment. The read range can be calculated using the Friis free-space formula, shown in formula 1 as follows:

$$r = \frac{\lambda}{4\pi} \sqrt{\frac{P_t G_t G_r \tau}{P_{th}}}. \quad (1)$$

$\lambda$ is the wavelength, $P_t$ is the power transmitted by an RFID reader, $G_t$ is the gain of the transmitting antenna, $G_r$ is the gain of the receiving antenna (e.g., loop antenna 102), $P_{th}$ is the minimum threshold sufficient to power to provide enough power to an RFID tag (e.g., RFID tag 100), and $\tau$ is the power transmission coefficient and is shows below in formula 2 as follows:

$$\tau = \frac{4R_c R_a}{|Z_c + Z_a|^2}, \text{ where } 0 \leq \tau \leq 1. \quad (2)$$

Also, the impedance of the RFID tag 100 is shown in formula 3 as follows:

$$Z_C = R_C + jX_C \quad (3).$$

The impedance of the loop antenna 102 is shown in formula 4 as follows:

$$Z_A = R_A + jX_A \quad (4).$$

Where $Z_a$ is the antenna impedance, $Z_c$ is the charge pump impedance, $R_a$ is the real part of the antenna impedance, $X_a$ is the imaginary part of the antenna impedance, $R_c$ is the real part of the charge pump input impedance, and $X_c$ is the imaginary part of the charge pump input impedance.

With reference to formulas 1 and 2 above, to improve the read range of an RFID tag, e.g., the RFID tag 100, the sensitivity of the RFID tag needs to be increased, preferably to better than −18 dBm and/or the input of the RFID tag can be matched to the impedance of the loop antenna. For example, the RFID tag 100 at nodes 116 and 118 is impedance matched to the loop antenna 102.

The charge pump stage 110 includes several cascading rectification stages. The sensitivity of the charge pump stage 110 depends on several parameters including the load current, the conduction angle (or angles) of each rectifier stage, substrate losses, the process spread and the like. In order to facilitate rectification efficiency, the conduction angle of the diodes 122, 124, 126, 128, 130 and 132 of the charge pump stage 110 may be tunable. Power mismatch (sometimes referred to as impedance mismatch) may be cause by spread of the real part of the RFID tag impedance due to load and process spread and/or the spread on the input capacitance due to the interface of the loop antenna 102 with the substrate.

Figure 2A:
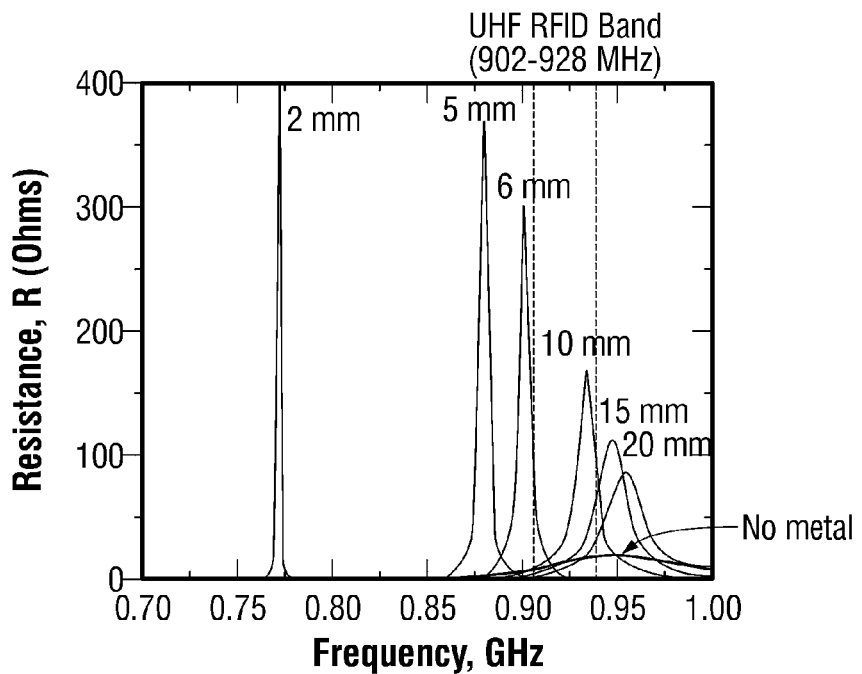
FIGS. 2A-2B show two graphics illustrating the metal proximity effects on the impedance of an antenna of an RFID tag.
Figure 2B:
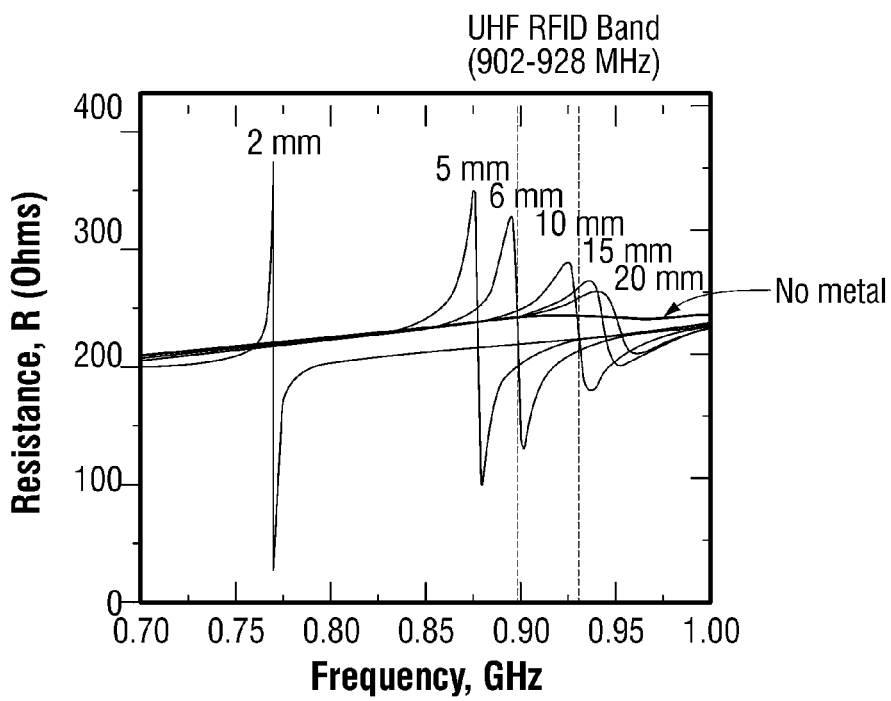

Referring to the drawings, FIGS. 2A and 2B show two graphics illustrating the metal proximity effects on the impedance of an antenna of an RFID tag. FIG. 2A shows the effect on the real part of the impedance of an antenna caused by the metal proximity effect for various metal depths. Additionally, FIG. 2B shows the effect on the imaginary part of the impedance of an antenna caused by the metal proximity effect for various metal depths. The metal proximity effect causes induced currents on the metal to flow in the opposite direction to the current of a loop antenna. As a consequence, the Q-factor of the loop antenna increases which, in turn: reduces radiation resistance; reduces radiated power; reduces bandwidth; and increases the impedance mismatch because the impedance changes.

Figure 3:
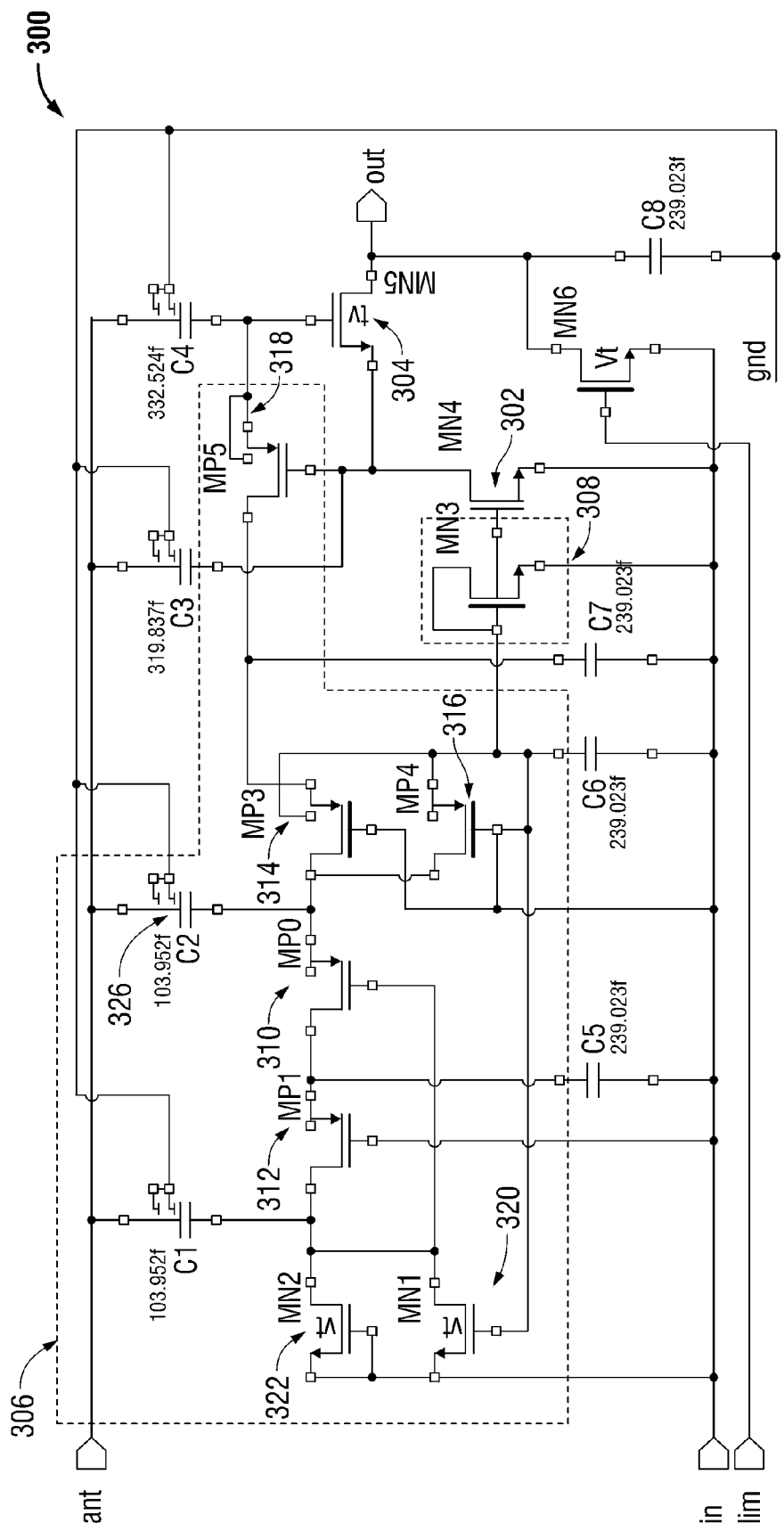
FIG. 3 shows a schematic diagram of a charge pump stage having voltage biased diodes and utilizing a VT-cancellation technique in accordance with the present disclosure.

Referring to the drawings, FIG. 3 shows a schematic diagram of a charge pump stage 300 having voltage biased diodes and utilizing a VT-cancellation technique in accordance with the present disclosure. Charge pump stage 300 includes rectifier diodes 302 and 304 which are voltage biased using an auxiliary charge pump 306 and a voltage clipper (diode) 308. The auxiliary charge pump 306 includes transistors 310, 312, 314, 316, 318, 320 and 322, and capacitors 324 and 326. The voltage clipper 308 limits the gate/source voltage and facilitates the RF-to-DC rectification gain at high input powers. Because of the low power operation, the voltage clipper 308 has relatively higher impedance. The charge pump stage 300 functions less efficiently at higher input power levels because of the higher impedance of the voltage clipper 308 resulting from the conduction angle of the rectifier diodes 302 and 304 exceeding $\pi$. The biasing that occurs using the VT-cancellation technique is fixed and does not allow for control of the real part of the impedance of the rectifier diodes 302 and 304.

Figure 4:
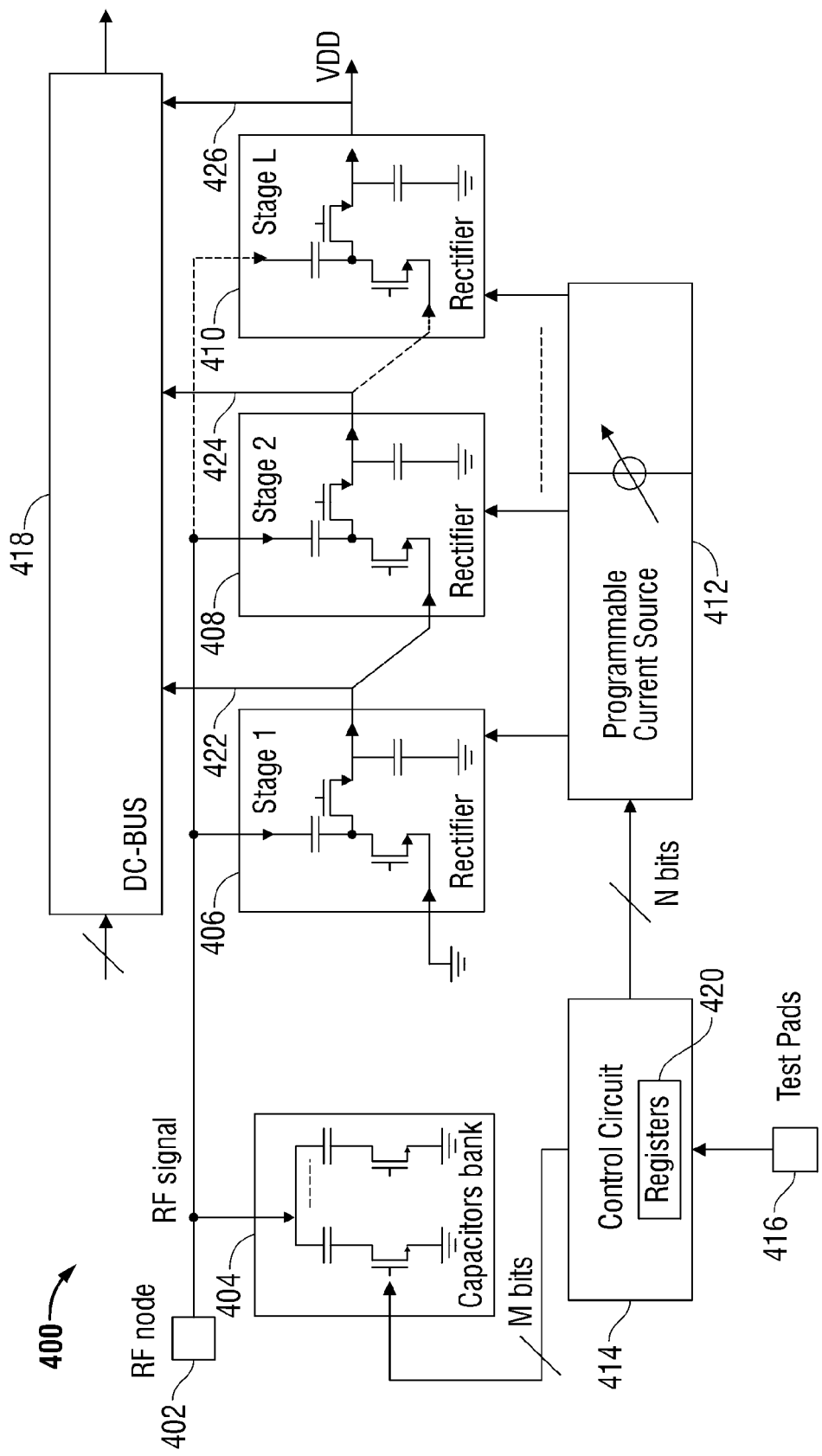
FIG. 4 shows a schematic diagram of a tunable charge pump stage of an RFID tag in accordance with the present disclosure.

FIG. 4 shows a schematic diagram of a tunable charge pump stage 400 of an RFID tag in accordance with the present disclosure. The charge pump stage 400 includes an RF node 402, a capacitor bank 404, current-biased rectifier stages 406, 408 and 410, a programmable current source 412, a control circuit 414, a test pad 416, and a DC bus 418. The control circuit 414 includes several registers 420 that may be programmed via the test pad 416. The control circuit 414 programs the programmable current source 412 to current bias each of the rectifier stages 406, 408, and 410. The rectifier stages 406, 408, and 410 are cascading.

The rectifier stages 406 and 408 output intermediate voltages to the nodes 422 and 424, respectively, into the DC bus 418 for use within the RFID logic. The DC bus 418 can provide one or more voltages to one or more logic components. For example, the DC bus 418 can provide a supply voltage to power the majority of an RFID tag's circuitry. The rectifier stage 410 outputs a DC output voltage to the node 426. The DC output voltage at the node 426 is sometimes referred to as the system voltage, and is a sufficient voltage for powering RFID logic. Each subsequent rectifier stage of the rectifier stages 406, 408, and 410 increases the voltage from the previous stage using energy for the RF signal. The rectifying of the RF signal in each of the rectifier stages 406, 408, and 410 boosts the voltage for the next rectifier stage.

The control circuit 414 selects the imaginary part of the impedance of the charge pump stage 400 by selecting a capacitance of the capacitor bank 404. The capacitor bank 404 provides capacitance to the RF node 402. Additionally, the control circuit 414 programs the current biases of the programmable current source 412 to select the real part of the impedance of the charge pump stage 400. The control circuit 414 individually programs individual current biases supplied by the programmable current source 412 to the rectifier stages 406, 408, and 410.

The control circuit 414 controls the capacitor bank 404 and programs the programmable current source 412 to provide various biases to the rectifier stages 406, 408, and 410 to achieve various effects, including: to individually tune the Q-factor of the rectifier stages 406, 408, and 410; to tune the aggregate Q-factor of the rectifier stages 406, 408, and 410; to tune the Q-factor of capacitor bank 404; and/or to tune the aggregate Q-factor of charge pump stage 400.

The control circuit 414 controls one or more conduction angles of the rectifiers 406, 408, and/or 410 by programming the various current biases of the programmable current source 412. The programmable current source 412 may individually and/or collectively adjust the conduction angle or angles of the rectifier stages 406, 408 and 408.

The control circuit 414 controls the capacitor bank 404 to control the imaginary part of the impedance of the charge pump stage 400. Additionally, the control circuit 414 programs the current source 412 to vary the bias currents to the rectifier stages 406, 408, and 410 to control the real part of the impedance of the charge pump stage 400. The control circuit 414 independently and/or collectively varies the real and imaginary parts of the charge pump stage 400.

The control circuit 414 utilizes various parameters to tune the charge pump stage 400 to facilitate efficient transfer of an RF signal for use as energy to power an RFID tag. For example, the control circuit 414 can tune various Q-factors of the charge pump stage 400, tune the impedance of the charge pump stage 400, and control the operation of the charge pump stage 400 to facilitate efficient utilization of the RF signal induced within a loop antenna by an RF interrogation signal. For example, the control circuit 414 may control the charge pump stage 400 such that charge pump stage 400 has an impedance that about equal to the complex conjugate of the impedance from the antenna coupled to the RF node 402.

Figure 5:
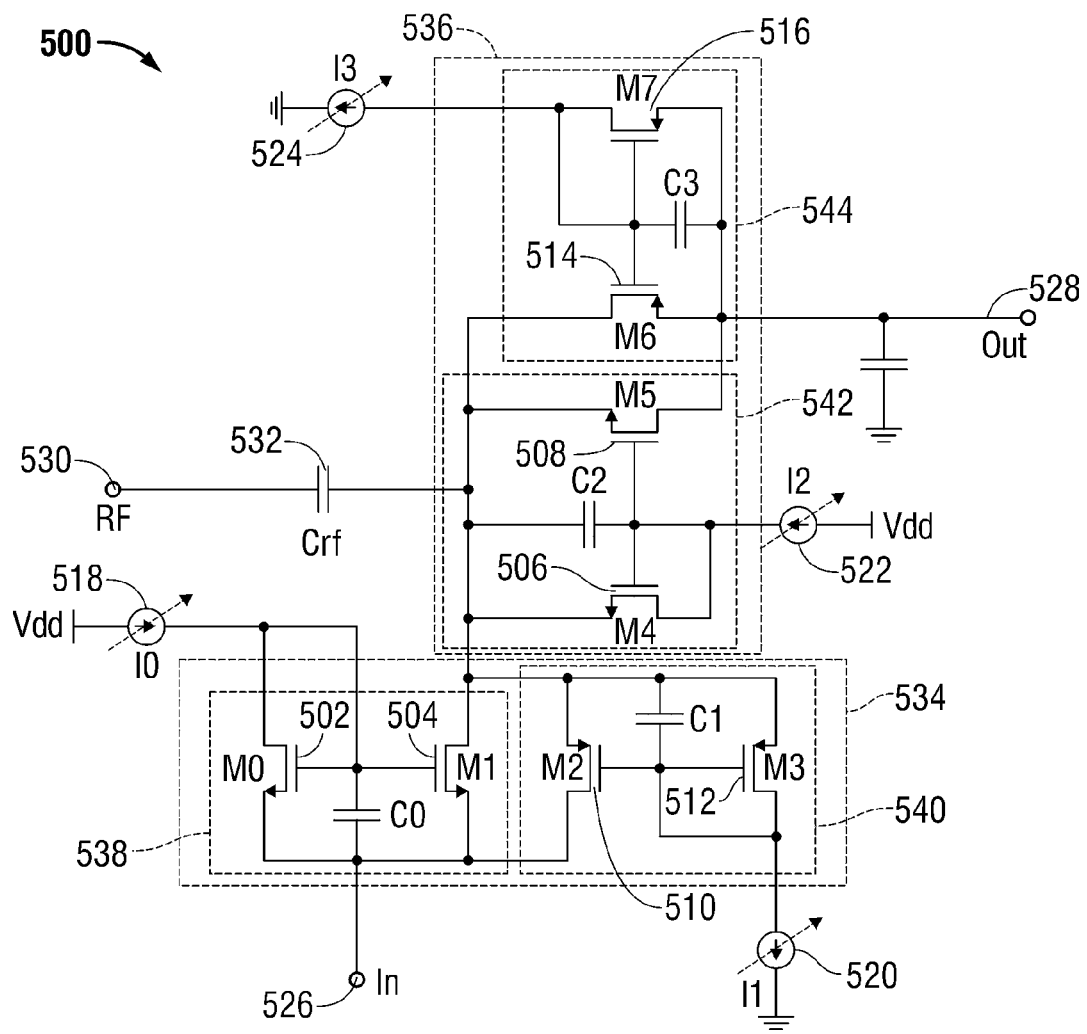
FIG. 5 shows a schematic diagram of a current-biased rectifier stage of the tunable charge pump of FIG. 4 in accordance with the present disclosure.

FIG. 5 shows a schematic diagram of a current-biased rectifier stage 500 (e.g., one of rectifier stages 406, 408, and/or 410) of the tunable charge pump of FIG. 4 in accordance with the present disclosure. The rectifier stage 500 includes a first diode 534 and a second diode 536.

The first diode 534 includes an nMOS rectifier 538 and a pMOS rectifier 540. The nMOS rectifier 538 includes transistors 502 and 504. The pMOS rectifier 540 includes transistors 510 and 512. The second diode 536 includes an nMOS rectifier 542 and a pMOS rectifier 544. The nMOS rectifier 542 includes transistors 506 and 508. The pMOS rectifier 544 includes transistors 514 and 516.

The current sources 518, 520, 522, and 524 may be utilized to tune the conduction angles of the first diode 534 and the second diode 536. The current sources 518, 520, 522, and 524 provide current biases for the rectifier stage 500. The current sources 518, 520, 522, and 524 are part of the programmable current source 412 and are programmable by the control circuit 414 (see FIG. 4). Current sources 518 and 520 tune the conduction angle of the first diode 534. Current source 522 and 524 tune the conduction angle of the second diode 536.

The rectifier stage 500 receive a voltage from the node 526 and boosts the voltage to provide a higher voltage at the node 528. The RF signal is provided at the RF node 530. The RF signal at the node 530 provides energy to boost the voltage. The capacitor 532 is used to AC-couple the rectifier stage 500 to a loop antenna, e.g., the loop antenna 118 as shown in FIG. 1.

Figure 6:
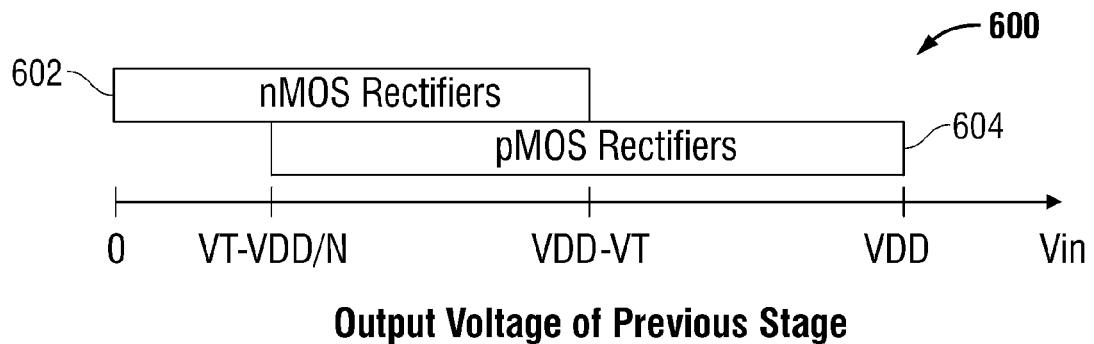
FIG. 6 shows a graphic illustration of the operating regions of the diodes of a current-biased rectifier stage, such as is shown in FIG. 5, in accordance with the present disclosure.

Referring to the drawings, FIG. 6 shows a graphic illustration of the operating region of the diodes of a current-biased rectifier stage, such as is shown in FIG. 5, in accordance with the present disclosure. The x-axis is the output voltage of the previous stage. When the output voltage of the previous stage is low, only the nMOS rectifiers (e.g., nMOS rectifiers 538 and 542) are active. The nMOS rectifiers' (e.g., nMOS rectifiers 538 and 542) operating region is indicated by 602. When the output voltage of the previous stage is high, only the pMOS rectifiers (e.g., pMOS rectifiers 540 and 544) are active. The pMOS rectifiers' (e.g., pMOS rectifiers 540 and 544) operating region is indicated by 604. Note that from VT-VDD/N to VDD-VT both types of rectifiers (nMOS and pMOS) are active as shown by the overlapping of the regions 602 and 604. N is the number of stages. VT is the MOS threshold voltage. VDD is the desired supply voltage. FIG. 6 shows that rectifier stage 500 facilitates a high quality RF-to-DC conversion gain independent from the DC output voltage of the previous rectification stage.

Figure 7:
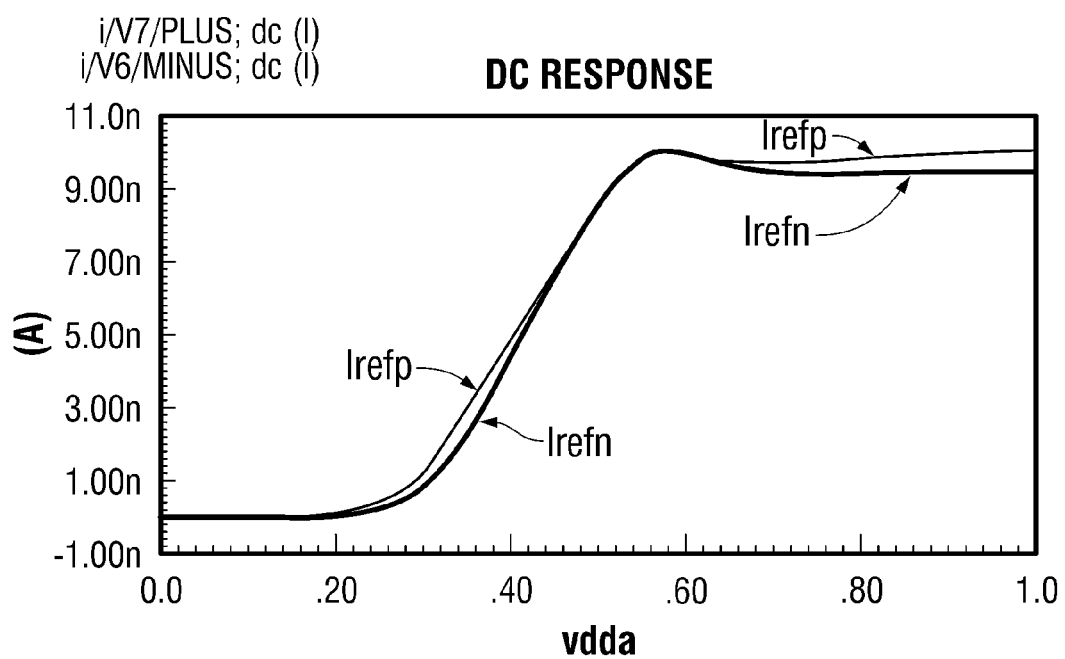
FIG. 7 shows simulation data when current biasing the current-biased rectifier stage of FIG. 5 in accordance with the present disclosure.

FIG. 7 shows simulation data of the reference current for current biasing the rectifier stage 500 of FIG. 5. This facilitates efficient operation of the rectifier at higher input powers. A binary weight resistive network 800 of FIG. 8 may tune (or control) the current biasing. A set iref<3:0> digital signal 802 controls the current. The binary weighted resistive network 800 is part of the programmable current source 412 of FIG. 4.

Control circuit 414 of FIG. 4 can vary and control the conduction angle of a rectifier stage (e.g., rectifier stages 406, 408, and 410 of FIG. 4) by changing the value of the reference current utilizing the set iref<3:0> digital signal 802. The conduction angle has an impact on the parameters of the rectifier stage, such as the rectifier stage's efficiency, the rectifier stage's Q-factor of input impedance, the rectifier stage's sensitivity and the like.

Figure 8:
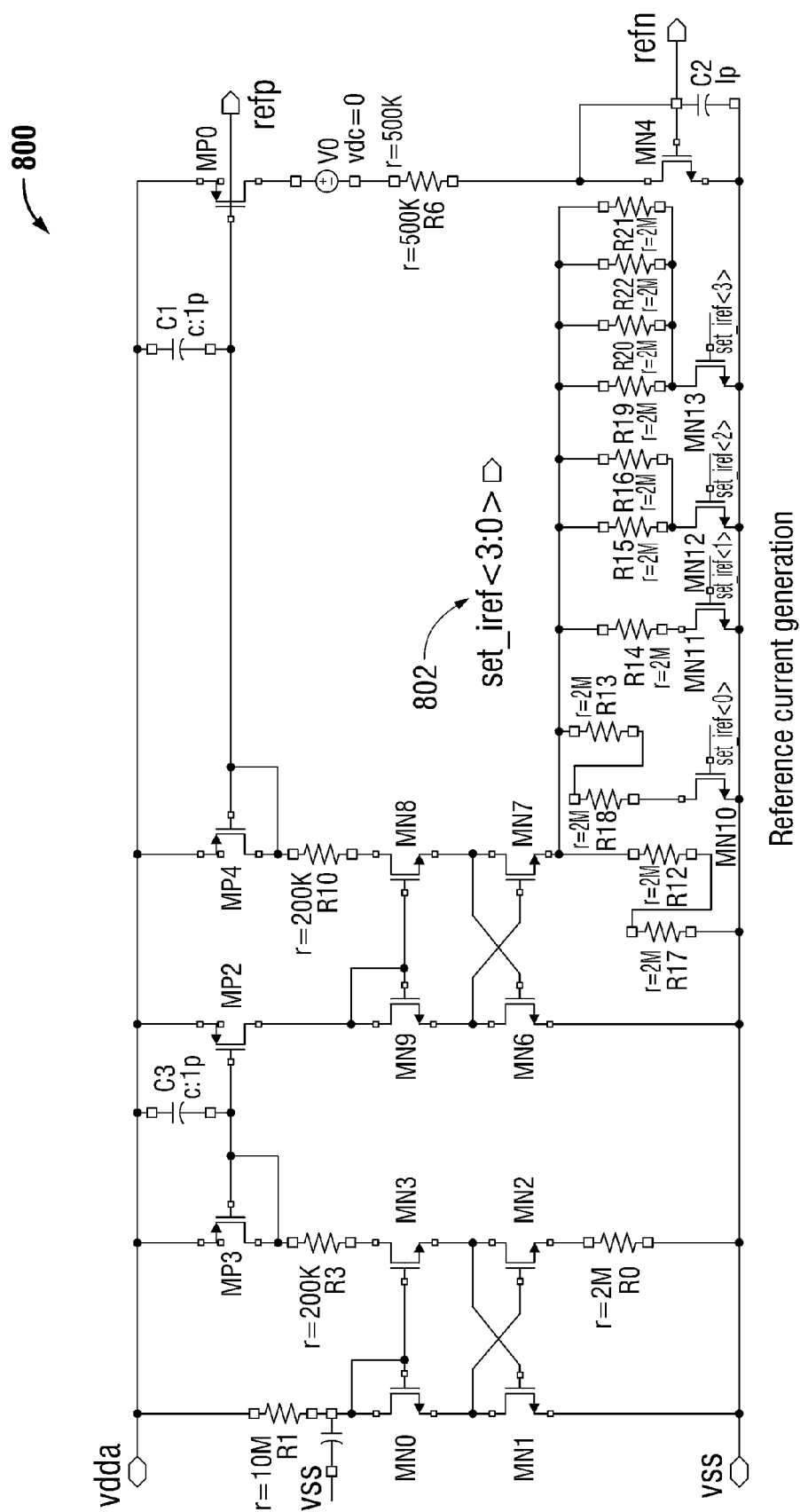
FIG. 8 shows a schematic diagram of a circuit within the programmable current source of the tunable charge pump stage of FIG. 4 in accordance with the present disclosure.
Figure 9A:
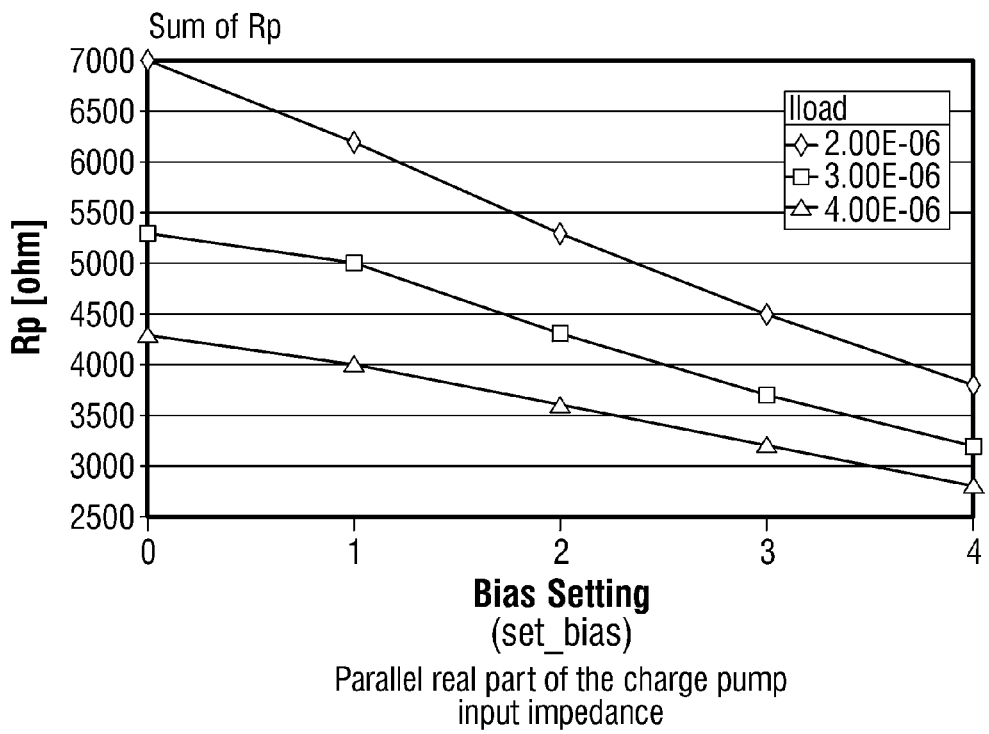
FIGS. 9A-9B shows simulation data as two graphic illustrations of the simulated effect of the current bias of the programmable current source of FIG. 8 on the impedance of the tunable charge pump stage of FIG. 4 in accordance with the present disclosure.
Figure 9B:
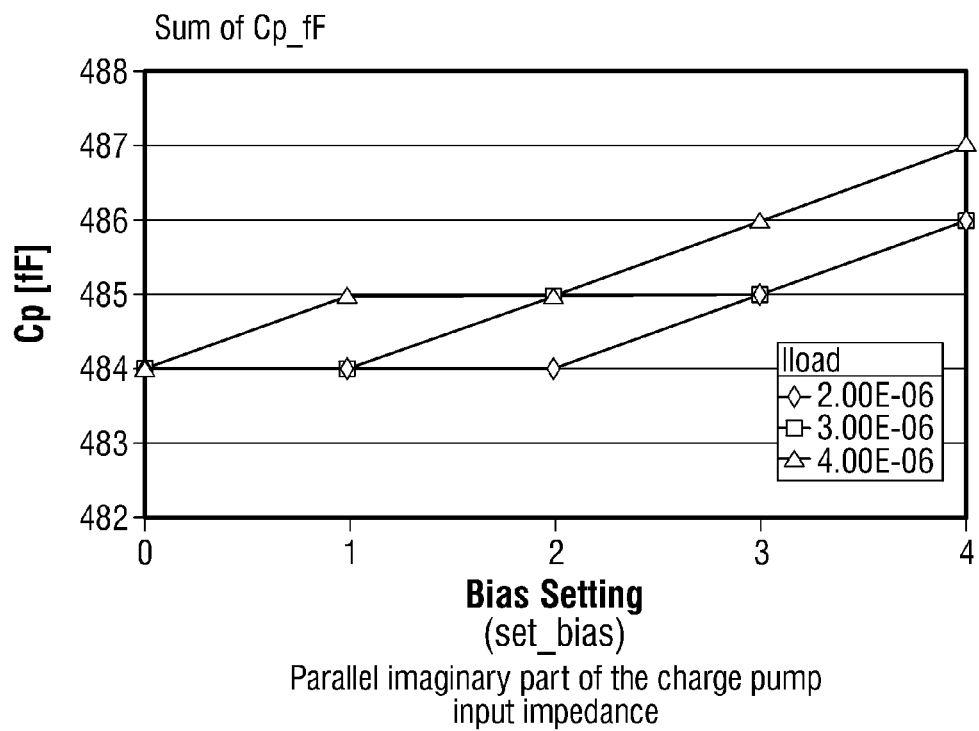
Figure 10:
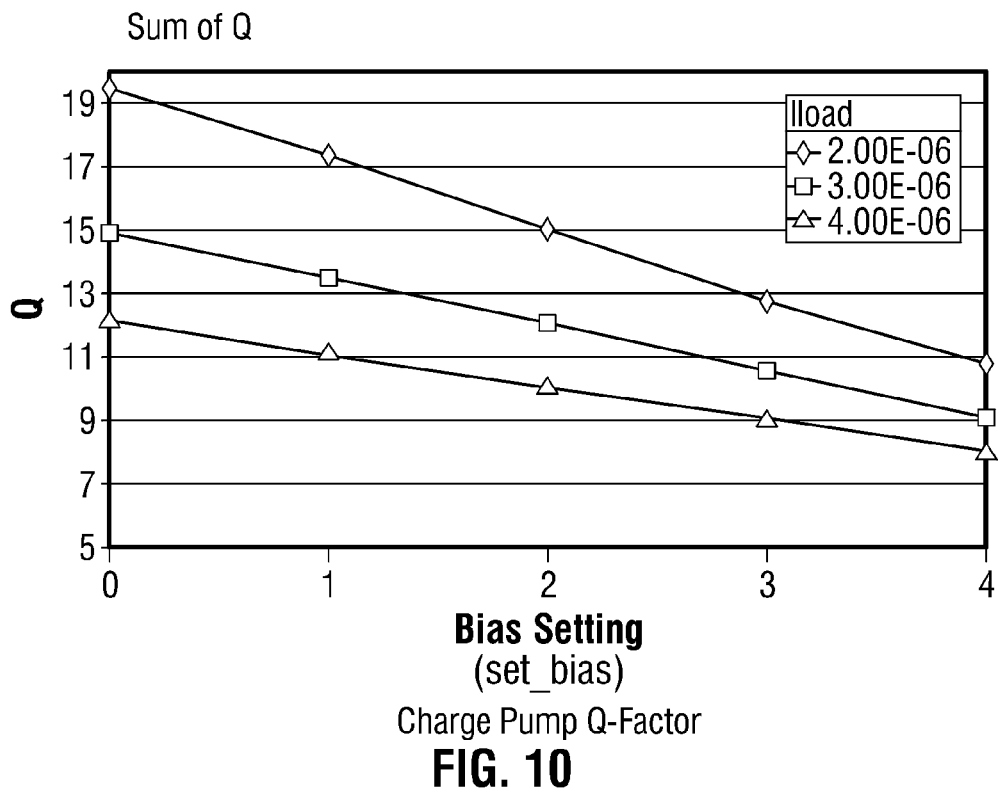
FIG. 10 shows simulation data as a graphic illustration of the simulated effect of the current bias of the programmable current source of FIG. 8 on the Q-factor of the tunable charge pump stage of FIG. 4 in accordance with the present disclosure.
Figure 11:
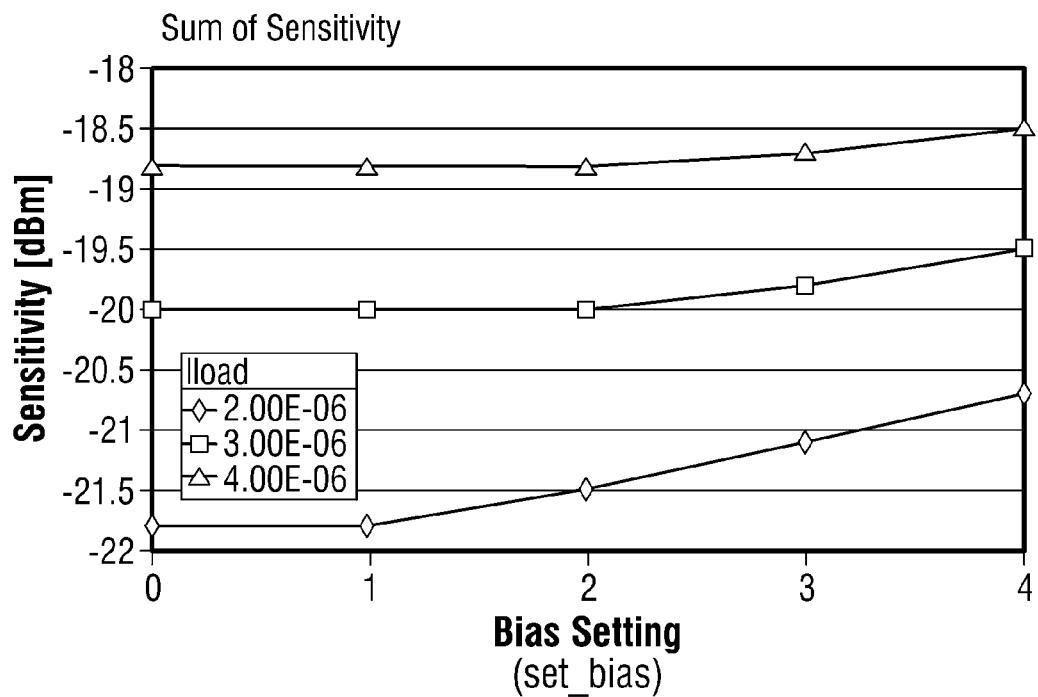
FIG. 11 shows simulation data as a graphic illustration of the simulated effect of the current bias of the programmable current source of FIG. 8 on the sensitivity for several load values of the tunable charge pump stage of FIG. 4 in accordance with the present disclosure.

FIGS. 9A-9B show simulation data as two graphic illustrations of the simulated effect of the current bias of the programmable current source 414 of FIG. 8 on the impedance of the tunable charge pump stage 400 of FIG. 4 using CMOS14 technology in accordance with the present disclosure. FIG. 9A shows that by changing the bias current of a rectifier, the real part is independently changed. The imaginary part of the charge pump input impedance is not affected when changing the bias setting as shown in FIG. 9B. The corresponding Q-factor changes as well as illustrated in FIG. 10. FIG. 10 shows simulation data as a graphic illustration of the simulated effect of the current bias of the programmable current source of FIG. 8 on the Q-factor of the tunable charge pump stage of FIG. 4 using CMOS14 technology. The sensitivity is also affected when changing the value of the reference current, which is illustrated in FIG. 11. FIG. 11 shows simulation data as a graphic illustration of the simulated effect of the current bias of the programmable current source of FIG. 8 on the sensitivity for several load values of the tunable charge pump stage of FIG. 4 using CMOS14 technology. Better power matching (e.g., impedance matching) at the node 402 of FIG. 4 may compensate for the small loss in sensitivity.

Additionally, the imaginary part of an RFID tag's input impedance may be tuned by switching on or off a number of binary weight fringe capacitors within capacitor bank 414 of FIG. 4. Therefore, the real and imaginary parts may be tuned independently from each other.

Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods and techniques that are insubstantially different from those described above and/or in the appended claims are also intended to be within the scope of the disclosure.

The drawings described are only schematic and are non-limiting. In the drawings, for illustrative purposes, the size of some of the elements may be exaggerated and not drawn to a particular scale. Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B. This expression signifies that, with respect to the present invention, the only relevant components of the device are A and B.

Furthermore, the terms "first", "second", "third" and the like, whether used in the description or in the claims, are provided for distinguishing between similar elements and not necessarily for describing a sequential or chronological order. It is to be understood that the terms so used are interchangeable under appropriate circumstances (unless clearly disclosed otherwise) and that the embodiments of the invention described herein are capable of operation in other sequences and/or arrangements than are described or illustrated herein.

While several embodiments of the disclosure have been shown in the drawings and/or discussed herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A charge pump stage, comprising:
   an RF node configured to provide an RF signal;
   a capacitor bank having a selectable capacitance, wherein the capacitor bank is electrically coupled to the RF node thereby providing the selectable capacitance thereto;
   a plurality of current-biased rectifier stages electrically coupled to the RF node and configured to receive the RF signal therefrom, the plurality of current-biased rectifier stages configured to provide a DC output;
   a DC bus configured to receive the DC output from the plurality of rectifier stages and to provide a supply voltage;
   a programmable current source configured to provide a plurality of current bias signals, wherein each of the plurality of current-biased rectifier stages is configured to receive at least one of the plurality of current bias signals from the programmable current source; and
   a control circuit in electrical communication with the capacitor bank and the programmable current source, wherein the control circuit is configured to operatively select the selectable capacitance of the capacitor bank and program the current source.

2. The charge pump stage according to claim 1, wherein each of the plurality of current bias signals is individually programmable by the control circuit.

3. The charge pump stage according to claim 1, wherein each of the plurality of current-biased rectifier stages comprises:
   a prior stage node;
   a following stage node; and
   a rectifier circuit electrically coupled to the RF node to rectify the RF signal therefrom, wherein the rectifier receives a first voltage from the prior stage node and boosts the first voltage using the rectified RF signal to a second voltage, wherein the rectifier provides the second voltage to the following stage node.

4. The charge pump stage according to claim 3, wherein the plurality of current-biased rectifier stages includes a first stage, wherein the prior stage node of the first stage is coupled to ground.

5. The charge pump stage according to claim 3, wherein the plurality of current-biased rectifier stages includes a final stage, wherein the following stage node is electrically coupled to the DC bus to provide the DC output thereto.

6. The charge pump stage according to claim 1, wherein at least some of the plurality of current-biased rectifier stages are cascading.

7. The charge pump stage according to claim 6, wherein the plurality of current-biased rectifier stages includes an intermediate rectifier stage providing an intermediate voltage, wherein the DC bus receives the intermediate voltage from the intermediate rectifier stage to provide the supply voltage.

8. The charge pump stage according to claim 1, wherein at least one of the plurality of current-biased rectifier stages includes a first diode comprising a first nMOS rectifier and a first pMOS rectifier.

9. The charge pump stage according to claim 8, wherein the at least one of the plurality of current-biased rectifier stages includes a second diode comprising a second nMOS rectifier and second pMOS rectifier.

10. The charge pump stage according to claim 1, wherein the capacitor bank, the plurality of current-biased rectifier stages, the DC bus, the programmable current source and the control circuit are integrated on a semiconductor substrate.

11. The charge pump stage according to claim 1, wherein the control circuit is configured to tune the Q-factor of the plurality of current-biased rectifier stages by varying the plurality of current bias signals provided thereto.

12. The charge pump stage according to claim 11, wherein the control circuit individually tunes the Q-factor of each of the plurality of current-biased rectifier stages.

13. The charge pump stage according to claim 1, wherein the control circuit is configured to tune an aggregate Q-factor of the capacitor bank and the plurality of current-biased rectifier stages.

14. The charge pump stage according to claim 13, wherein the control circuit is configured to tune the aggregate Q-factor by selecting the selectable capacitance of the capacitor bank and individually varying each of the current bias signals provided by the programmable current source to the plurality of current-biased rectifier stages.

15. The charge pump stage according to claim 1, wherein the control circuit is configured to individually vary the conduction angle of a diode of each of the plurality of current-biased rectifier stages.

16. The charge pump stage according to claim 1, wherein the capacitor bank and the plurality of rectifiers define an impedance having a real part and an imaginary part.

17. The charge pump stage according to claim 16, wherein the control circuit selects the capacitance of the capacitor bank to substantially control the imaginary part of the impedance and the control circuit programs the current source to substantially control the real part of the impedance thereby separately controlling the real and imaginary parts of the impedance.

18. The charge pump stage according to claim 16, wherein the control circuit is configured to match the impedance to a complex conjugate of an antenna coupled to the RF node.

19. The charge pump stage according to claim 1, wherein the control circuit further comprises:
   a capacitor bank register adapted to select the selectable capacitance of the capacitor bank;
   a plurality of current bias registers each adapted to control a current bias signal of the plurality of current bias signals; and
   a test pad operatively coupled to the capacitor bank register and the plurality of current bias registers, wherein the test pad receives digital data for programming the capacitor bank register and the plurality of current bias registers.

20. The charge pump stage according to claim 1, wherein the programmable current source includes a binary weighted resistive network adapted to receive a binary signal from the control circuit thereby programming the programmable current source, wherein the binary weighted resistive network provides a current bias signal of the plurality of current bias signal corresponding to the binary signal from the control circuit.

21. The charge pump stage according to claim 1, wherein the capacitor bank includes a plurality of switchable binary weighted fringe capacitors.

* * * * *